Figure 1:
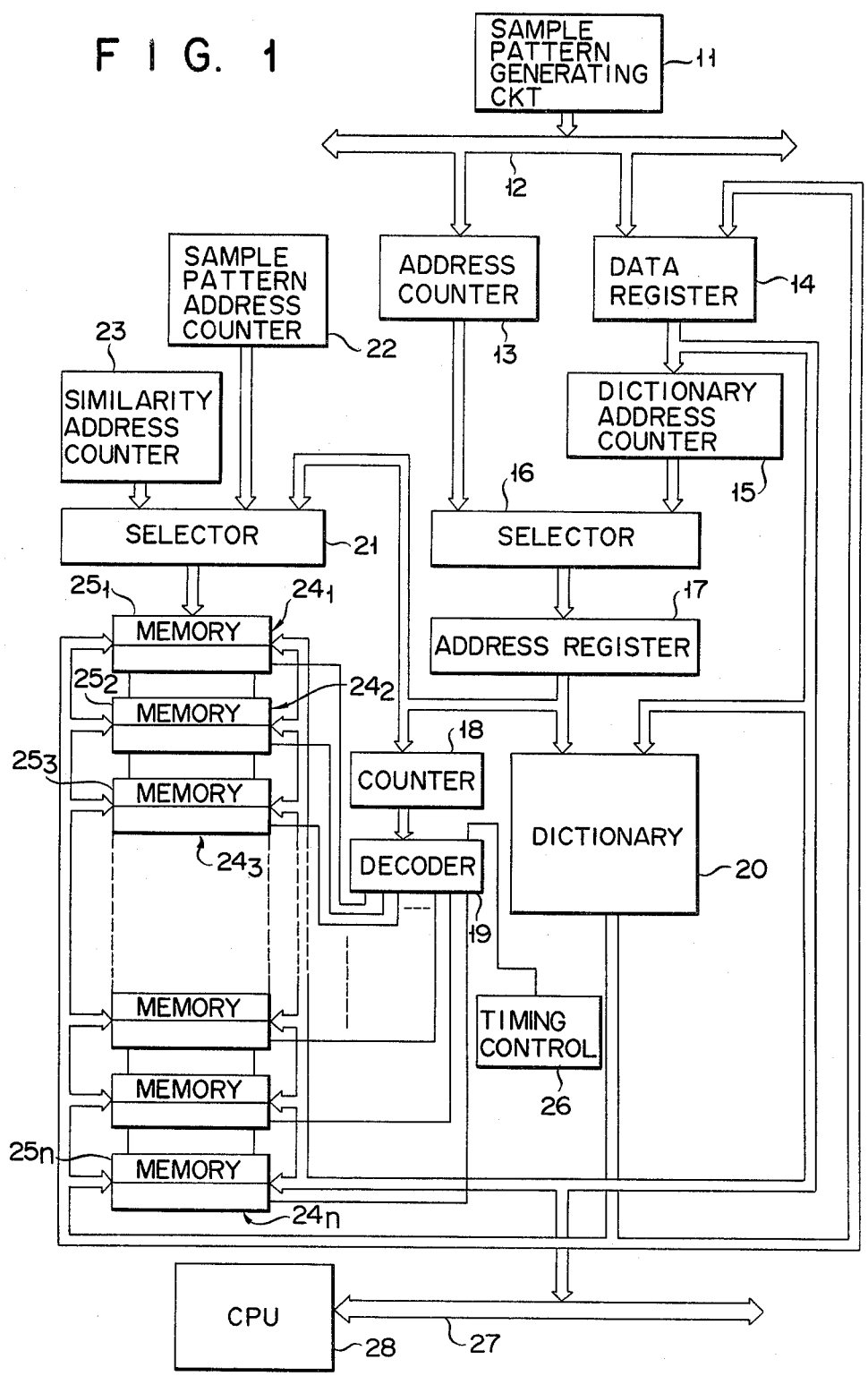

United States Patent [19]

Asakawa

[11] 4,429,414

[45] Jan. 31, 1984

[54] PATTERN RECOGNITION SYSTEM OPERATING BY THE MULTIPLE SIMILARITY METHOD

[75] Inventor: Teruyoshi Asakawa, Yokohama, Japan

[73] Assignee: Tokyo Shibaura Denki Kabushiki Kaisha, Kawasaki, Japan

[21] Appl. No.: 242,567

[22] Filed: Mar. 11, 1981

[30] Foreign Application Priority Data

Mar. 13, 1980 [JP] Japan .................................. 55-31861

[51] Int. Cl.³ .............................................. G06K 9/62
[52] U.S. Cl. ........................................ 382/30; 382/34
[58] Field of Search ................... 340/146.3 Q, 146.2; 382/30, 34, 50; 358/101, 107; 343/5 MM

[56] References Cited

U.S. PATENT DOCUMENTS

| | | | |
|---|---|---|---|
| 3,104,372 | 9/1963 | Rabinow et al. | 382/50 |
| 3,158,840 | 11/1964 | Baskin | 382/34 |
| 3,576,534 | 4/1971 | Steinberger | 340/146.3 Q |
| 3,644,890 | 2/1972 | Matthews | 382/50 |
| 3,688,267 | 8/1972 | LLjima et al. | 340/146.3 Q |
| 4,014,000 | 3/1977 | Und et al. | 340/146.3 Q |
| 4,119,946 | 10/1978 | Taylor | 382/30 |
| 4,138,662 | 2/1979 | Shimoyama | 340/146.3 Q |
| 4,148,062 | 3/1979 | Kamin | 340/146.3 Q |
| 4,254,400 | 3/1981 | Yoda et al. | 340/146.3 Q |
| 4,288,782 | 9/1981 | Bander et al. | 340/146.3 Q |
| 4,319,221 | 3/1982 | Sakoe | 340/146.3 Q |

Primary Examiner—Leo H. Boudreau
Attorney, Agent, or Firm—Cushman, Darby & Cushman

[57] ABSTRACT

A plurality of pattern similarity computation circuits are provided, and different sample pattern data and a reference pattern data are coupled to the individual computation circuits, whereby the calculation of the similarity degree of the reference pattern with respect to the individual sample patterns is simultaneously made in the respective computation circuits.

7 Claims, 2 Drawing Figures

F I G. 2
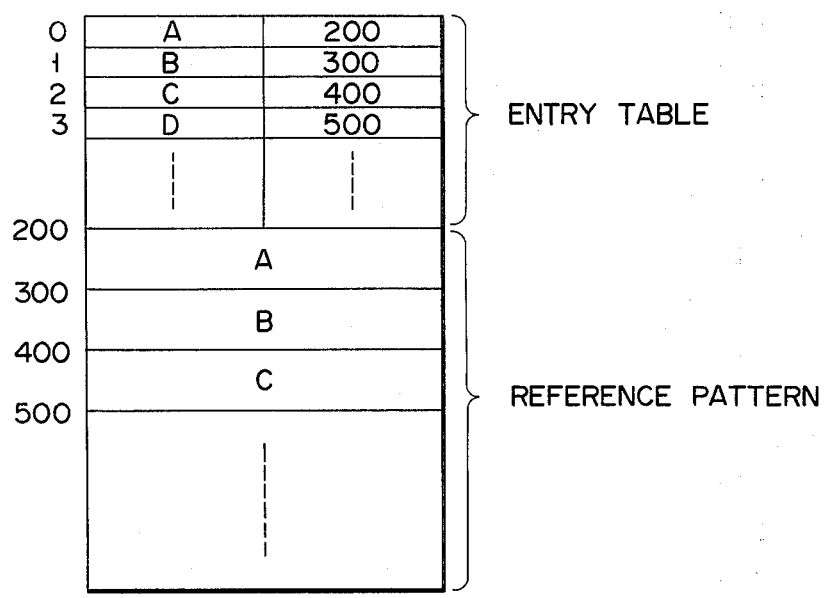

PATTERN RECOGNITION SYSTEM OPERATING BY THE MULTIPLE SIMILARITY METHOD

This invention relates to pattern recognition systems operating by the multiple similarity method for character readers.

With recent considerable improvement of the character reader techniques, the character readers have been used in various fields. Generally, the character readers are constructed such as to make use of the pattern similarity method for the recognition of characters. For example, with a character optical reader, numeral figures or alphabet letters in a slip, for instance, are optically read out, and the data thus obtained are converted into character patterns, which are checked for the similarity degree with each of a plurality of reference patterns stored in a dictionary memory. Each character pattern thus checked is recognized as a reference pattern, the similarity degree of which is the highest. In the prior art character reader, however, the calculation of the similarity degree of each of the reference patterns with respect to the sample character patterns is effected in a single similarity degree computation circuit for one sample character after another. Therefore, the processing speed is considerably slow, and a considerable processing time is required where a large number of characters are to be identified.

An object of the invention, accordingly, is to provide a pattern recognition system, which can effect simultaneous computation of the similarity degree with respect to a number of characters and thus permit improvement of the character recognition processing speed.

According to the invention, there is provided a pattern recognition system, which comprises a plurality of similarity degree calculation circuits, and in which sample character patterns are inputted to the respective similarity computation circuits for simultaneous calculation of the similarity degree of each of a plurality of reference patterns with respect to them.

This invention can be more fully understood from the following detailed description when taken in conjunction with the accompanying drawings, in which:

FIG. 1 is a block diagram showing an embodiment of the pattern recognition system according to the invention; and FIG. 2 is a view showing the memory format of a dictionary memory shown in FIG. 1.

Referring to FIG. 1, a sample pattern generating circuit 11 for generating input patterns, i.e., sample patterns, is connected to a data bus 12. This circuit 11 generates sample pattern data of 7 by 10 dots (one dot being formed by 4 bits). The data bus 12 is connected to an address counter 13 and a data register 14. The address counter 13 counts a number of bit rows that form a sample pattern, and the data register 14 stores the sample pattern in one bit row after another. The output port of the data register 14 is connected to the dictionary address counter 15. The output port of the address counter 13 and dictionary address counter 15 is connected to the input port of a selector 16. The output port of the selector 16 is connected to the input port of an address register 17. The output port of the address register 17 is connected through a counter 18 to a decoder 19 and is also connected to a dictionary 20 and a selector 21. A sample pattern address counter 22 and a similarity address counter 23 are connected to the selector 21. The selector 21 is connected to a plurality of similarity degree computation circuits $24_1$ to $24_n$. These similarity degree computation circuits $24_1$ to $24_n$ each have an input port connected to the data register 14 and an output port connected to the output port of the dictionary 20 and to an input port of the data register 14. These circuits also each include a computation section and a memory. The computation section has a circuit construction as disclosed in, for instance, the U.S. Pat. No. 3,688,267.

The operation of the pattern recognition system of the above construction will now be described. When a sample pattern data corresponding to, for instance, the character "A" is generated from the sample pattern generating circuit 11, data of one bit row of the generated sample pattern data is stored in the data register 14, and a first address i.e. an initial address is set in the address counter 13. The initial address in the address counter 13 is transferred through the selector 16 to the address register 17 and stored therein. When the initial address of the address register 17 is provided to the counter 18, the counter 18 is caused to count up. The contents of the counter 18 are decoded by the decoder 19 to enable the computation circuit 24. At this time, the address of the memory $25_1$ of the computation circuit $24_1$ is specified by the initial address data transferred from the address register 17 through the selector 21 to the computation circuit $24_1$, and the data of the first bit row transferred from the data register 14 is stored in this address. Then, when the second bit row data of the sample pattern is transferred to the data register 14, the address counter 13 is caused to count up. The updated address in the address counter 13 is transferred through the selector 16 to the address register 17 and stored therein. This address data specifies the next address in the address memory $25_1$, and the second bit row data is stored in this address. In this way, every time one bit row data of the sample pattern is transferred to the data register 14, the address counter 13 is caused to count up, and the successive bit rows are progressively stored in the successive addresses of the memory $25_1$. When all the bit rows of the first sample pattern are stored in the memory $25_1$, the address counter 13 is reset. Then, when the sample pattern for the second character, for instance, the character "B" is generated from the sample pattern generating circuit 11 and the first bit row of the sample pattern is transferred to the data register 14, the initial address is again set in the address counter 13. When this initial address is transferred through the selector 16 and address register 17 to the counter 18, the counter 18 is caused to count up. The contents of the counter 18 are decoded by the decoder 19 to enable the computation circuit $24_2$. Thus, the second sample pattern is stored in the memory $25_2$ in the computation circuit $24_2$. When a plurality of sample patterns are stored in the respective memories $25_1$ to $25_n$ of the computation circuits $24_1$ to $24_n$, the initial address of the memories $25_1$ to $25_n$ is set in the sample pattern address counter 22. At this time, a timing signal is supplied from a timing control circuit 26 to the decoder 19, and in response to this signal the decoder 19 gives an enable signal to all computation circuits $24_1$ to $24_n$. In this state, a pre-processing for the multiple similarity method is carried out. The multiple similarity degree is expressed as:

$$\text{Multiple similarity degree} = \frac{\sum_{j=1}^{N}\left(\sum_{i=1}^{70} h_i \phi_{ij}\right)^2}{\sum_{i=1}^{70}(h_i)^2 - \left(\sum_{i=1}^{70} h_i\right)^2 / 70}$$

where $h_i$ (i being 1 to 70) is the bit row data of the sample pattern, and $\phi_{ij}$ (i being 1 to 70, j being the number of reference patterns representing reference characters stored in the dictionary 20. In the pre-processing calculation, the term $$\sum_{i=1}^{70}(h_i)^2$$

and the term $$\left(\sum_{i=1}^{70} h_i\right)^2$$

are calculated. At this time, each bit row data of each sample pattern is read out from each of the memory addresses of the memories $25_1$ to $25_n$ which are successively specified by the content of the sample address counter 22, and the aforementioned terms are calculated in the computation sections of the respective computation circuits. The result of calculation is stored in the memory address of each of the memories $25_1$ to $25_n$ specified by the similarity address counter 23 which is counted up each calculation.

When the calculations of both the terms are ended and the results are stored in the specified memory addresses, the dictionary address counter 15 is set at an initial address. The initial address of the dictionary address counter 15 is transferred through the selector 16 to the address register 17 and stored therein. The memory address of the dictionary 20 is specified by the address stored in the address register 17. In the dictionary 20, data representing reference characters as shown in FIG. 2 are stored. As shown in FIG. 2, the dictionary 20 includes an entry table section and a reference pattern memory section, and each of addresses in the entry table section is specified depending upon the address stored in the address register 17. If the initial address is "0", an address 200 in the reference pattern section is read out from the entry table, and the address where the data of the reference character "A" is stored is specified by the address 200. In the addresses 200 through 299 are stored a plurality of reference patterns representing respective reference characters "A", for instance 3 to 10 reference patterns in the case of hand written letters or 16 to 17 reference patterns in the case of Chinese characters. These reference patterns are each constituted by 7 by 10 dots each constituted by 6 bits. Of these reference patterns, the first bit row data of the first reference pattern is read out from the dictionary 20 and transferred to the computation circuits $24_1$ to $24_n$. The successive bit row data of the first reference pattern are progressively read out from the dictionary 20, and all the bit row data are subjected by the computation circuits $24_1$ to $24_n$ at one time to the calculation of the term $$\sum_{i=1}^{70} h_i \phi_{ij}$$

and then at one time to the calculation of the term $$\sum_{j=1}^{N}\left(\sum_{i=1}^{70} h_i \phi_{ij}\right)^2.$$

The results of the calculation are stored in the next address to that in which the first reference pattern is stored. Subsequently, the calculation of the aforementioned term is effected with respect to the following reference patterns, and the results are stored in the respective memories. When the calculation with respect to all the reference patterns representing the respective reference characters "A" is ended, the dictionary address counter 15 is caused to count up, and the reference pattern corresponding to the next reference character "B" is read out according to the content of the address counter 15 for making the calculation as described above. In the above way, calculations with respect to desired reference characters, for instance, reference characters "A" through "Z", are effected, and the results are stored in the memories $25_1$ to $25_n$. Thereafter, the calculation of the multiple similarity degree is made as the final calculation. This calculation is effected in a CPU 28 with the calculation results for the three terms mentioned above, transferred from the memories $25_1$ to $25_n$, through the data register 14 and a data bus 27 to the CPU 28. Thus, the reference pattern of the highest similarity degree is provided as the result of recognition.

As has been described in the foregoing, according to the invention a plurality of similarity degree computation circuits are provided, and the similarity degree calculation is simultaneously effected in these similarity degree computation circuits with respect to each of a plurality reference patterns. Thus, the processing speed in the similarity degree calculation can be considerably increased.

What is claimed is:
1. A pattern recognition system comprising:
   a sample pattern generating circuit for sequentially generating, one by one, a plurality of sample pattern data corresponding to a plurality of sample patterns, respectively, each of said sample pattern data having a plurality of bit rows;
   a dictionary memory which stores a plurality of reference pattern data comprising pieces of data each representing one of a plurality of reference patterns, respectively, each of said reference pattern data having a plurality of bit rows;
   a plurality of pattern similarity computation circuits, each including a memory section and a computation section and being connected to said sample pattern generating circuit and said dictionary memory; and
   means for transferring the sample pattern data to the respective memory sections of said pattern similarity computation circuits to store the sample pattern data in the respective memory sections and for transferring the reference pattern data to said computation sections one piece at a time;
   said computation sections of said pattern similarity computation circuits simultaneously calculating the degrees of similarity of pattern data in said memory sections, with respect to said one piece of the reference pattern data.

2. A pattern recognition system according to claim 1, wherein said transferring means includes means for transferring said plurality of the sample pattern data from said sample pattern generating circuit, one after another, to said memory sections of said pattern similarity computation circuits and means for transferring the reference pattern data to said memory sections, one bit row at a time.

3. A pattern recognition system according to claim 2, wherein said transferring means transfers the sample pattern data and the reference pattern data to said pattern similarity computation circuits for every one bit row.

4. A pattern recognition system according to claim 1, wherein said transferring means includes means for counting the bit rows of each of the sample pattern data and producing each of the counting results as address data and means for specifying an address of each of said memory sections according to the address data, to store the contents of each of the bit rows at the address of the corresponding memory section.

5. A pattern recognition system according to claim 1, wherein said pattern similarity computation circuits store the results of calculations performed in each of said computation sections into the respective memory sections.

6. A pattern recognition system according to claim 1, wherein said dictionary memory includes an entry table section storing a plurality of entry address data and a reference pattern memory section having a plurality of address groups corresponding to the entry address data, each of said address groups including a plurality of addresses in which a plurality of reference pattern data corresponding to a plurality of reference patterns representing one character are respectively stored.

7. A pattern recognition system according to claim 6, wherein each of the reference patterns has $7 \times 10$ points, each of which is represented by six bits.

* * * * *